UNITED STATES PATENT OFFICE.

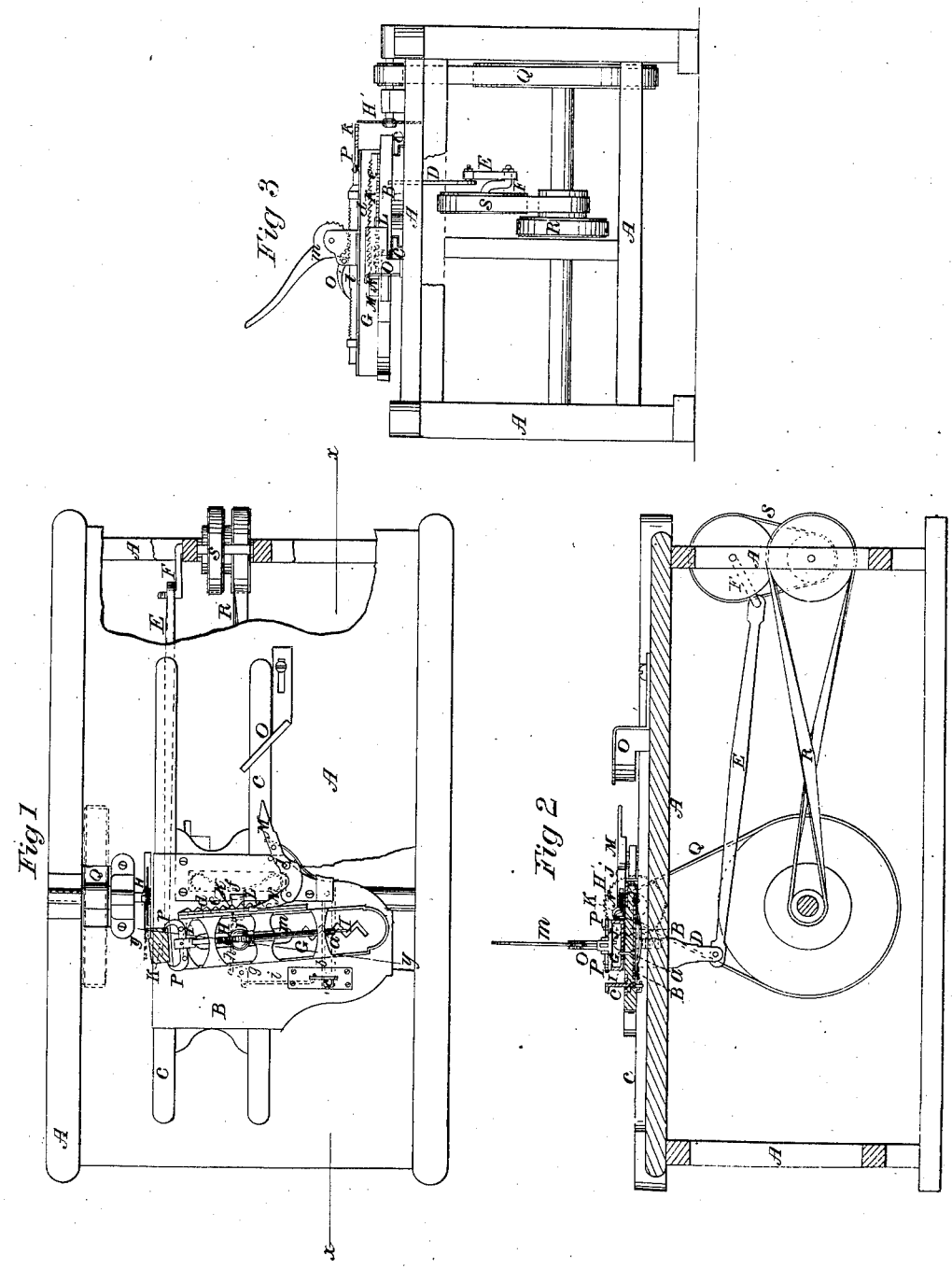

ELIJAH MORGAN, OF MORGANTOWN, VIRGINIA.

SHINGLE-MACHINE.

Specification of Letters Patent No. 11,791, dated October 10, 1854.

*To all whom it may concern:*

Be it known that I, ELIJAH MORGAN, of Morgantown, in the county of Monongalia and State of Virginia, have invented a new and useful Improvement in Machines for Cutting Shingles; and I do hereby declare that the following is a full, clear, and exact description of the same, reference being had to the accompanying drawings, forming part of this specification, in which—

Figure 1, is a plan or top view of a shingle machine with my improvements. Fig. 2, is a vertical longitudinal section of the same through the line $x$, $x$, in Fig. 1. Fig. 3, is an end view of the same.

Similar letters of reference in each of the several figures indicate corresponding parts.

The principal feature of novelty in my improvement consists, in a new arrangement of mechanism for feeding the head block and the log secured in it up to a saw having its axis arranged at right angles to a reciprocating carriage; and simultaneous therewith, and with the back movement of the reciprocating carriage, giving the head block and log such an angle in relation to the saw that each strip when cut off will be of the proper taper shape to form a shingle.

The next feature of novelty consists, in a toggle joint dog for holding the log while sawing it into shingles.

To enable others skilled in the art to make and use my invention, I will proceed to describe its construction and operation.

A, represents the frame of the machine, made of oblong form, and constructed so as to receive and support all the operative mechanism and the gearing for driving the same, as represented in the drawing.

B, represents the reciprocating carriage. It is caused to move longitudinally over the ways C, C, on top of the frame A, by the crank movement D, E, F. On top of this carriage I arrange my improved head block G, and the mechanism for operating it. The head block G, is placed so as to move transversely to the carriage B, and is provided with a straight oblong slot H, and a zig-zag slot I, as shown in Fig. 1. The straight slot H, is in front of the zig-zag slot, and a set screw J, passes through it, and connects the head-block to the reciprocating carriage, as shown. By thus providing the head-block with the slot H, it is rendered capable of moving in a transverse direction and feeding the log to the saw H′, said slot also allows of the head-block being turned on the set screw J, to any or the proper angle for giving the required taper to the shingle, as illustrated in Fig. 1. The zig-zag slot I, serves in connection with a fin $a$, which works in it, for shifting or reversing the position of the head-block, and setting it to the angle necessary to give the proper shape to the shingle every time the reciprocating carriage completes its return or back movement. The pin $a$, passes through the reciprocating carriage and is secured to the center of a flat spring $b$, which is connected to, and operated by a double elbow lever $c$, Figs. 1 and 2; said lever, by being depressed, causing the spring to draw the pin $a$, out of connection with the zig-zag slot of the head-block.

K, is a bar attached to the side of the head-block, and having teeth $d$, $e$, on its top and side, as shown.

L, is a sliding spring stop or pawl, fitting in the teeth $e$. This stop or pawl is placed horizontally in a groove or recess formed in the reciprocating carriage, and is thrown and held in contact with the teeth $e$, of the head-block, by the spring $f$, and moved out of contact with the same by the elbow shaped lever $g$, which is connected to it by the rod $h$, and to the double elbow lever $c$, by the rod $i$, as shown in dotted lines in Fig. 1. This stop or pawl serves for locking the head block while the shingle is being cut. It is operated simultaneous with the moving of the pin $a$, out of connection with the zig zag groove—they both being connected to the double elbow lever $c$, as represented, and operated by it. When the pin $a$, and the stop or pawl are thus thrown out of operation, the head-block can be moved laterally with ease and facility, back or forward.

M, N, is a jointed spring lever arranged horizontally on top of the reciprocating carriage, and secured in its place by the fulcrum pin $j$, in the manner represented. The jointed end N, of this lever catches into the teeth $d$, as represented.

O, is a cam or angular stop for the end M, of the said jointed spring lever to play against as the reciprocating carriage makes its return or backward movement. This angular stop serves for operating upon the end M, of the lever, and throwing it from toward the saw, and thereby causing it to act upon the end N, and move it with the head block toward the saw, and thus effect the required feed of the log, just before the saw commences to operate. Simultaneous with this movement of the head-block and log, an inclination corresponding to the taper desired to be given to the shingle, is given to the head-block by the zig zag slot and the pin working in the same. The direction of the inclination given to the head block when the first shingle is sawed off is reversed, as illustrated by the red line $y$, $y$, at the moment the reciprocating carriage makes its return or back movement; and thus for every shingle that is cut off, or for every complete movement—(back and forth) of the reciprocating carriage, two changes in the angle of the head block, and consequently the log, are secured.

P, P, are two levers arranged on top of the head-block, and forming a toggle joint dog for holding the log $k$, as represented. These levers are opened and closed by the lever and rack bar $l$, $m$, and held in either position by the pawl $o$, and ratchet teeth on the horizontal rack bar $l$, as shown in Fig. 3. To open the dog to insert the log, it is only necessary to depress the lever $m$, and vice versa when it is desired to close, or have them bite on the log.

The saw H′, has its arbor arranged at right angles to the line of travel of the reciprocating carriage, and is driven by the bands, Q, R, shown in red.

S, is a band for operating the crank movement.

By examining the drawing, the position of the log, in relation to the saw, while being cut, as the carriage moves forward, and its shape, after a shingle has been cut off, and the shape of the shingle itself will be seen.

What I claim as my invention, and desire to secure by Letters Patent, is:—

1. The providing of the head-block with an oblong straight slot H; a zig-zag slot I; and a fulcrum J, and combining the same with an arrangement of mechanism similar to that herein specified, or its equivalent, substantially as and for the purposes set forth.

2. I also claim the arrangement herein specified, for holding the log, substantially as set forth.

ELIJAH MORGAN.

Witnesses:
H. D. M. GEORGE,
A. HAYMOND.